US011188453B1

(12) United States Patent
Hicks et al.

(10) Patent No.: US 11,188,453 B1
(45) Date of Patent: Nov. 30, 2021

(54) VERIFICATION OF SOFTWARE TEST QUALITY USING HIDDEN VARIABLES

(71) Applicant: International Business Machines Corporation, Armonk, NY (US)

(72) Inventors: Andrew C. M. Hicks, Wappingers Falls, NY (US); Kevin Minerley, Red Hook, NY (US); Dale E. Blue, Poughkeepsie, NY (US); Ryan Thomas Rawlins, New Paltz, NY (US); Daniel Nicolas Gisolfi, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/122,009

(22) Filed: Dec. 15, 2020

(51) Int. Cl.
   *G06F 11/00* (2006.01)
   *G06F 11/36* (2006.01)
   *G06F 11/26* (2006.01)

(52) U.S. Cl.
   CPC .......... *G06F 11/3688* (2013.01); *G06F 11/26* (2013.01)

(58) Field of Classification Search
   CPC .... G06F 11/26; G06F 11/263; G06F 11/3676; G06F 11/3692; G06F 11/3688
   See application file for complete search history.

(56) References Cited

U.S. PATENT DOCUMENTS

| 6,167,352 A  | 12/2000 | Kavevsky et al. |
| 6,247,154 B1 | 6/2001  | Bushnell et al. |
| 6,917,840 B2 | 7/2005  | Lund |
| 7,237,231 B2 | 6/2007  | Lambert |

(Continued)

FOREIGN PATENT DOCUMENTS

| CN | 102073585 A | 5/2011 |
| CN | 109460354 A | 3/2019 |

(Continued)

OTHER PUBLICATIONS

Mell, P. et al., "The NIST Definition of Cloud Computing", Recommendations of the National Institute of Standards and Technology, NIST Special Publication 800-145, 7 pages, Sep. 2011.

(Continued)

*Primary Examiner* — Elmira Mehrmanesh
(74) *Attorney, Agent, or Firm* — Cantor Colburn LLP; Teddi Maranzano

(57) ABSTRACT

A system and related method comprise using a processor for executing a plurality of tests associated with a covering array of a test framework of the software test system on a first version of a system under test (SUT). For each of the plurality of tests, on a current test, the method comprises determining a current success rate value (SRV) for the current test that represents a success rate of the current test for the first version of the SUT. The method further comprises combining the current SRV of the first version of the SUT and current SRVs of the current test for prior versions of the SUT into a current test eigenvector associated with the (Continued)

current test. The method further comprises converting the current test eigenvector into a first eigenvalue that represents a health, accuracy, and quality of the first version of the SUT.

18 Claims, 5 Drawing Sheets

(56) References Cited

U.S. PATENT DOCUMENTS

| | | | |
|---|---|---|---|
| 7,331,007 B2* | 2/2008 | Fine | G01R 31/318357 703/13 |
| 7,480,602 B2 | 1/2009 | Duffie | |
| 7,813,911 B2 | 10/2010 | Triou, Jr. et al. | |
| 8,090,565 B2 | 1/2012 | Gaudette | |
| 8,386,851 B2 | 2/2013 | Ur | |
| 8,756,460 B2 | 6/2014 | Blue et al. | |
| 8,868,977 B2 | 10/2014 | Birnbaum et al. | |
| 9,218,271 B2 | 12/2015 | Segall et al. | |
| 9,600,403 B1 | 3/2017 | Raz et al. | |
| 9,710,371 B2* | 7/2017 | Tosar | G06F 11/3688 |
| 9,792,204 B2 | 10/2017 | Li et al. | |
| 10,133,649 B2 | 11/2018 | Li et al. | |
| 10,325,150 B2* | 6/2019 | Lu | G06K 9/0053 |
| 10,437,712 B1 | 10/2019 | Tyler et al. | |
| 2006/0010429 A1 | 1/2006 | Ihara | |
| 2006/0075305 A1 | 4/2006 | Robinson et al. | |
| 2009/0125270 A1 | 5/2009 | O'Shea et al. | |
| 2012/0317454 A1 | 12/2012 | Krenz-Baath et al. | |
| 2013/0090911 A1 | 4/2013 | Segall et al. | |
| 2013/0091382 A1 | 4/2013 | Segall | |
| 2015/0178421 A1 | 6/2015 | Borrelli | |
| 2020/0242010 A1 | 7/2020 | Hicks et al. | |
| 2020/0242012 A1 | 7/2020 | Hicks et al. | |
| 2020/0242013 A1 | 7/2020 | Hicks et al. | |
| 2021/0124676 A1* | 4/2021 | Ackerman | G06F 11/3676 |

FOREIGN PATENT DOCUMENTS

| | | |
|---|---|---|
| CN | 110765699 A | 2/2020 |
| CN | 111259394 A | 6/2020 |
| JP | H03241439 A | 10/1991 |

OTHER PUBLICATIONS

Mell et al., "The NIST Definition of Cloud Computing," Recommendations of the National Institute of Standards and Technology, NIST Special Publication 800-145, Sep. 2011, 7 pages.

Blue, et al., "Practical Fault Localization with Combinatorial Test Design," 2019 IEEE International Conference on Software Testing, Verification and Validation Workshops (ICSTW), pp. 268-271.

Disclosed Anonymously, "Using differences between versions of a Cartesian product model to deduce necessary changes in a test plan," An IP.com Prior Art Database Technical Disclosure; IP.com No. IPCOM000219028D:IP.com Electronic Publication Date: Jun. 18, 2012; 4 pages.

Hicks et al., "System Testing Infrastructure With Hidden Variable, Hidden Attribute, and Hidden Value Detection," U.S. Appl. No. 17/121,854, filed Dec. 15, 2020.

Hicks et al., "System Testing Infrastructure With Hidden Variable, Hidden Attribute, and Hidden Value Detection," U.S. Appl. No. 17/121,850, filed Dec. 15, 2020.

Hicks et al., "System Testing Infrastructure With Hidden Variable, Hidden Attribute, and Hidden Value Detection," U.S. Appl. No. 17/121,825, filed Dec. 15, 2020.

Hicks et al., "System Testing Infrastructure With Hidden Variable, Hidden Attribute, and Hidden Value Detection," U.S. Appl. No. 17/121,852, filed Dec. 15, 2020.

Kochte, "Boolean Reasoning for Digital Circuits in Presence of Unknown Values," May 22, 2014; 228 pages.

List of IBM Patents or Patent Applications Treated as Related; Date Filed: Jan. 7, 2021, 2 pages.

Python-Lattice Description, https://pypi.org/project/python-lattice/, downloaded January Jan. 7, 2021; 5 pages.

Wikipedia Definition of Heyting Algebra, https://en.wikipedia.org/wiki/Heyting_algebra, downloaded Jan. 7, 2021; 14 pages.

* cited by examiner

VERIFICATION OF SOFTWARE TEST QUALITY USING HIDDEN VARIABLES

BACKGROUND

Disclosed herein is a system and related method for verifying the quality of a software test, specifically, by using eigenvalues that represent Heyting algebraic mappings to verify software test oracle (template) quality over multiple n-wise covering arrays.

SUMMARY

According to one aspect disclosed herein, a computer-implemented method is provided comprising, using a processor for executing a plurality of tests associated with a covering array of a test framework of the software test system on a first version of a system under test (SUT). For each of the plurality of tests, on a current test, the method comprises determining a current success rate value (SRV) for the current test that represents a success rate of the current test for the first version of the SUT. The method further comprises combining the current SRV of the first version of the SUT and current SRVs of the current test for prior versions of the SUT into a current test eigenvector associated with the current test. The method further comprises converting the current test eigenvector into a first eigenvalue that represents a health, accuracy, and quality of the first version of the SUT. The method further comprises providing the eigenvectors and eigenvalues associated with the first version of the SUT to a maintainer of the SUT for improving a reliability of the test framework and reducing problems in at least one of the first version of the SUT and a subsequent version of the SUT.

According to another aspect disclosed herein, a computer software test system, is provided comprising a memory, and a processor. The processor is configured to execute a plurality of tests associated with a covering array of a test framework of the software test system on a first version of a system under test (SUT). For each of the plurality of tests, on a current test, the processor determines a current success rate value (SRV) for the current test that represents a success rate of the current test for the first version of the SUT, and combines the current SRV of the first version of the SUT and current SRVs of the current test for prior versions of the SUT into a current test eigenvector associated with the current test. The processor further converts the current test eigenvector into a first eigenvalue that represents a health, accuracy, and quality of the first version of the SUT. The processor further provides the eigenvectors and eigenvalues associated with the first version of the SUT to a maintainer of the SUT for improving a reliability of the test framework and reducing problems in at least one of the first version of the SUT and a subsequent version of the SUT.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
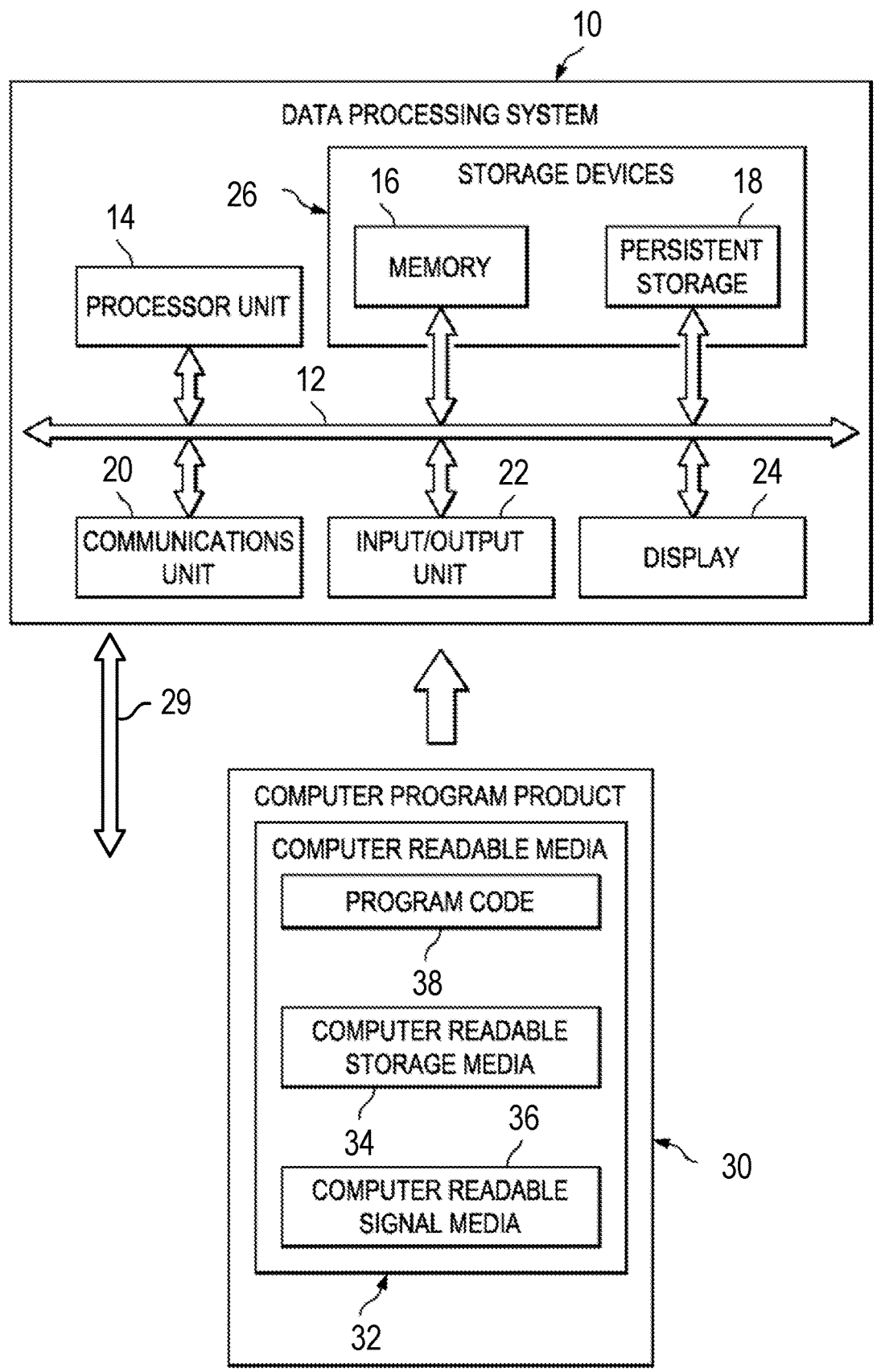
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EVC expiring virtual currency (a virtual currency having an expiration date, or subject to other virtual currency usage rules; local virtual currencies with expiration dates)
EVCU expiring virtual currency (units)
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory SaaS software as a service
SLA service level agreement
SRAM static random-access memory
VCUR virtual currency usage rules
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
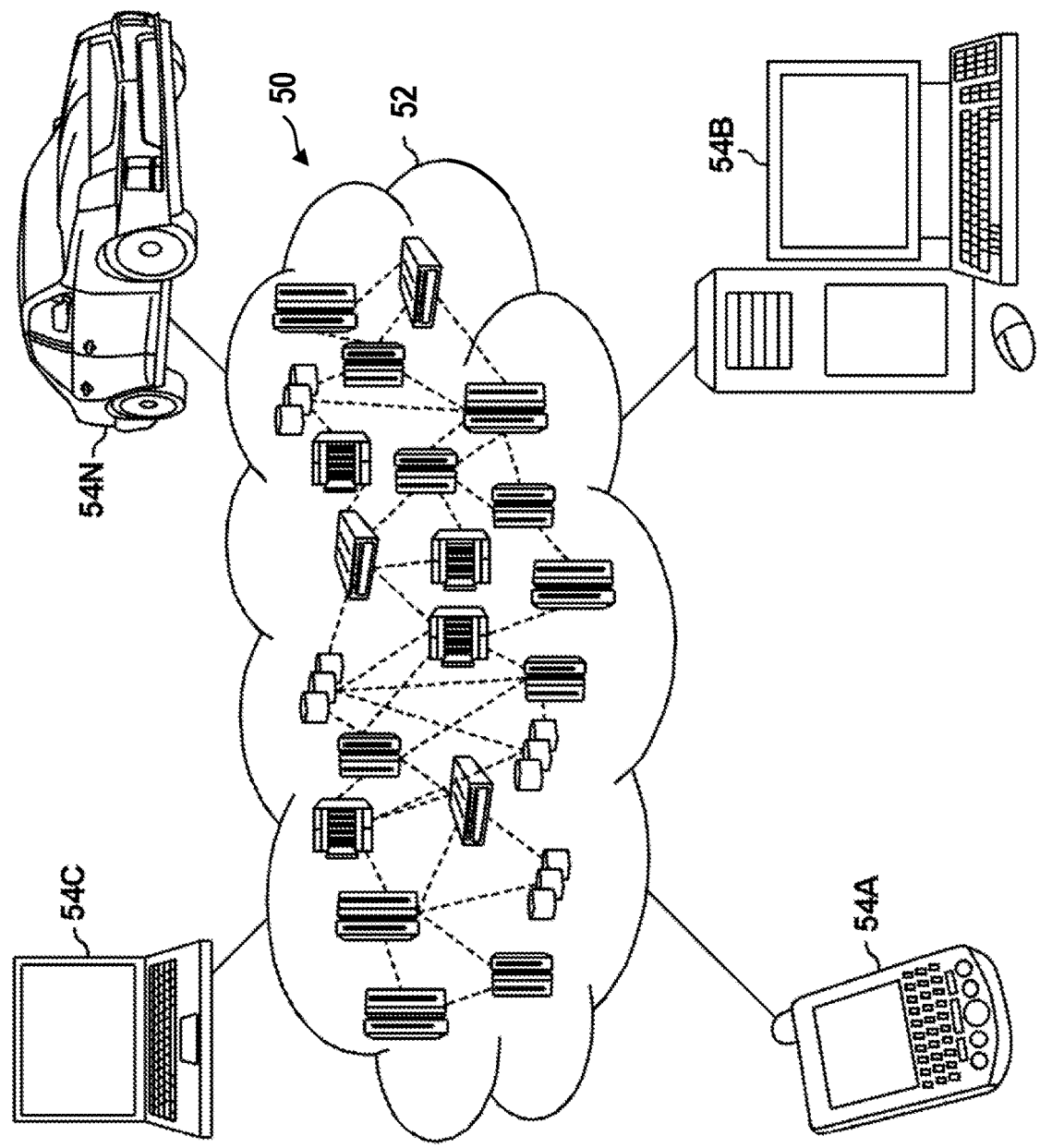
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
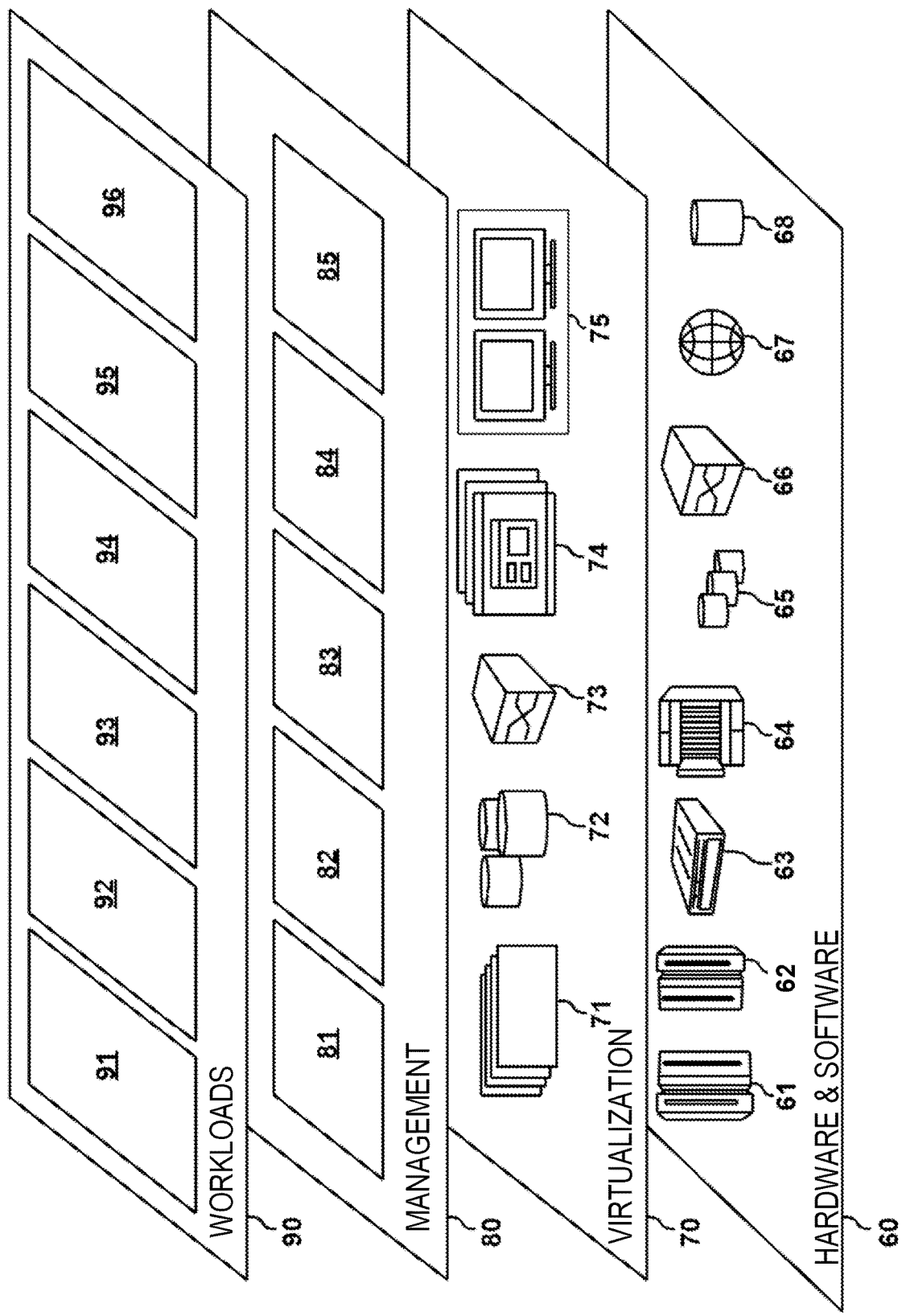
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing 96.

Any of the nodes 50 in the computing environment 52 as well as the computing devices 54A-N may be a DPS 10.

Verification of Software Test Quality

System Overview

In order to ensure quality software, significant testing is often performed on the software that attempts to fully exercise various components and paths of software execution. This testing involves its own software that may be organized into a test framework. During the life cycle of a given test effort, considerable time and resources are often invested into building up sustainable, trustworthy tests and infrastructure to provide a consistent way to verify a system under test (SUT). The end result of building high-quality infrastructure is a reliable, efficient way of continuously verifying the SUT throughout its lifetime, especially as maintenance and updates are applied over time.

A common problem that occurs with this paradigm is that as new maintenance patches and feature enhancements are created, a new test framework infrastructure may be generated along with them. Existing test frameworks and tools are often not maintained or updated in the process. This may lead to deficiencies in the overall testing process which do not surface until later in the development cycle for the SUT. These deficiencies can lead to costly problems for both the end user and the maintainer of the SUT. The ability to assess the health and stability of a given test framework, such as a combinatoric test oracle (a combination of mechanisms to determine whether a test has passed or failed), may significantly improve the reliability of the test framework while directly reducing the amount of problems that remain in the final version of the SUT.

The following definitions of Table 1 are used herein.

TABLE 1

| | Definitions |
|---|---|
| covering array | A collection of values where each row comprises an n-wise tuple. |
| hidden attribute | An attribute for inclusion in the model to generate better test vectors. |
| hidden attribute value | A value for inclusion in the attribute in a model to generate better test vectors. |
| hidden variable | A factor that may fail intermittently due to difficult to control parameters, such as other necessary systems or services running concurrently. |
| inverse combinatoric test | All combinations of attribute values where at least one value in the test vector remains the same as in the original test vector. |
| model | A dictionary of attributes and their corresponding values that can be used to create all combinations. |
| success rate | The output from Heyting algebra to describe the success/fail rate of a given attribute value over time. |
| test oracle | A test template. |
| test vector | A specific combination of attribute values in a model. |

Employing the use of pseudo-Boolean (also known as Heyting) algebra in conjunction with eigenvectors enables the creation of an eigenvalue representing the overall health and stability of a given test infrastructure.

A covering array is a mathematical object that may be used for software testing purposes. Software often has many possible configurations, each of which could be faulty. Software testing attempts to ensure that no actual error occurs in any such configuration. One possible method to achieve this goal is to simulate all possible configurations and check that no error occurs. However, this is typically impractical because there are too many configurations to check. Although there are other ways to approach software testing, few of them capture the abstraction and generality of simply running a "test and check" procedure on various sample configurations.

To make this method more practical, with the realization that testing all possible configurations of a software program may be redundant, an adequate simulation of all of the program's behavior may be achievable with a much smaller number of carefully chosen configurations or a subset of all possible combinations of test attributes/values. The notion of coverage may be used to quantify how well a set of sample configurations "covers'" the set of all configurations. Intuitively, full coverage means that all configurations are chosen and no coverage means that none are chosen. Intermediate levels of coverage are defined by a further parameter.

Table 2 illustrates an example covering array with an intermediate level of coverage (i.e., some, but not all possible combinations of attribute values (here, OS, Browser, and Network) are not covered). Table 2 represents the initial version of the SUT, and the Heyting values for each combination of attributes present in the table is 1.0, since one would expect initial success for the present attribute combinations.

TABLE 2

Covering Array Example for a Test Model with Calculated Heyting Values - Initial Version

| OS | Browser | Network | Heyting Value (Success Rate) |
|---|---|---|---|
| Windows 10 ® | Firefox ® | wireless | 1.0 |

TABLE 2-continued

Covering Array Example for a Test Model
with Calculated Heyting Values - Initial Version

| OS | Browser | Network | Heyting Value (Success Rate) |
|---|---|---|---|
| Windows 10® | Chrome® | wireless | 1.0 |
| Linux® | Firefox® | wired | 1.0 |
| Linux® | Firefox® | wireless | 1.0 |

Table 3 illustrates the covering array shown in Table 2 for an $N^{th}$ version of the SUT. As can be seen, the success rate (Heyting values) for certain combinations has now degraded somewhat, with some combinations degrading more than others.

TABLE 3

Covering Array Example for a Test Model
with Calculated Heyting Values - $N^{th}$ Version

| OS | Browser | Network | Heyting Value (Success Rate) |
|---|---|---|---|
| Windows 10® | Firefox® | wireless | 0.8 |
| Windows 10® | Chrome® | wireless | 0.85 |
| Linux® | Firefox® | wired | 0.95 |
| Linux® | Firefox® | wireless | 0.9 |

Each entry representing a test in a covering array generated from a combinatorial test oracle (e.g., each entry such as a row in Tables 2 and 3 above) may have a Heyting value calculated to represent its success rate. These success rates for each combination of attributes may be collected over time/versions and are defined by the Heyting values. The Heyting values may be used to describe an attribute's potential degradation from a hidden attribute or hidden attribute-value pair.

In one embodiment, the elements of an eigenvector may represent some combination of Heyting values within a test oracle for a given version of software/test-suite. By way of example, rows 1, 2, and 4 in Table 3 may be combined to determine the eigenvalue for a wireless network attribute. Here, the eigenvalue may be calculated, e.g., by creating the eigenvector {0.8, 0.85, 0.9} which may be compressed to an eigenvalue of:

$$\sqrt{0.8^2+0.85^2+0.9^2}=1.47394$$

In this example, the impact may be calculated based on its difference by its relation from the square root of the sum of the squares. Various combinations of attributes (table rows above) may be combined for this form of analysis. For example, rows 1, 3, and 4 may be combined for a particular browser=Firefox®, rows 1 and 2 may be combined for a particular operating system=Windows 10®, etc.

In another embodiment, each entry representing a test in a covering array generated from a combinatorial test oracle (e.g., each entry such as a row in Tables 2 and 3 above) may have a Heyting value calculated to represent its success rate. These success rates, for each combination of attributes, may be collected over time/versions into the eigenvector (as a set of the Heyting values). Based on the example in Tables 2 and 3, and if N represents only the $2^{nd}$ version, an eigenvector $v_1$ for the first row attribute combination may be {1, 0.8}, and, e.g., an eigenvector $v_3$ for the third row attribute combination may be {1, 0.95}. Various combinations/attributes (table rows above) may be combined an analyzed. The Heyting values can be used to describe an attribute's potential degradation from a hidden attribute or hidden attribute-value pair. For example, rows 1, 2, and 4 in Tables 2 and 3 may be combined to determine the eigenvalue for a wireless network attribute.

Figure 2A:
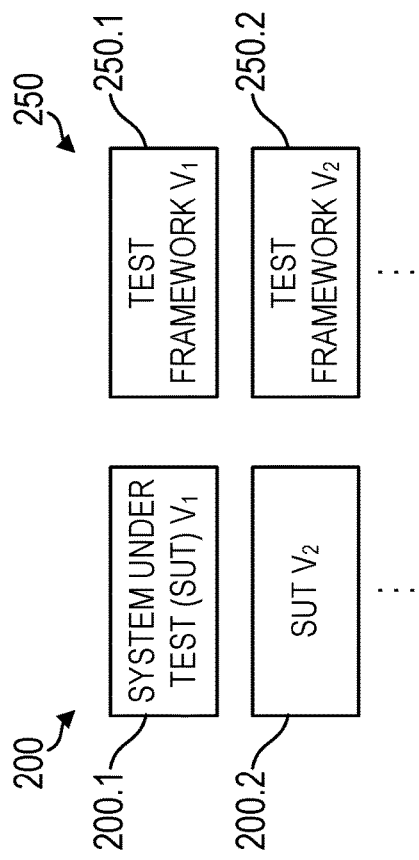
FIG. 2A is a block diagram that illustrates various elements of a software test quality verification system, according to some implementations.
Figure 2B:
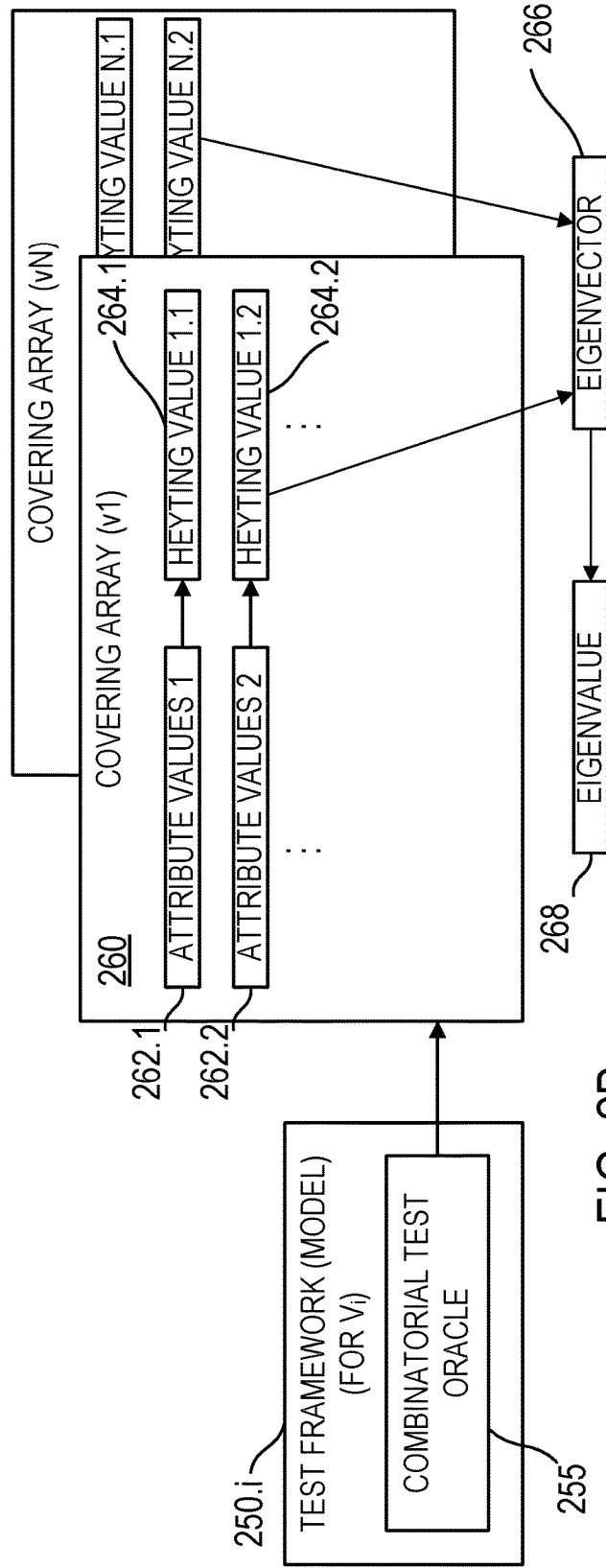
FIG. 2B is a block diagram illustrating the test framework and the covering arrays.

FIG. 2A illustrates the system that applies a test framework 250 to an SUT 200. The SUT 200 starts out as a first version of the SUT 200.1 that utilizes a first version of the test framework 250.1 in order to test the SUT's 200 functionality. A subsequent version of the SUT 200.2 may be tested by a subsequent version of the test framework 250.2. Referring to FIG. 2B, a test framework 250.i (or test model), for a given version i, uses a combinatorial test oracle to produce a covering array 260 (such as the one illustrated in Tables 2 and 3). Various attribute values (e.g., first combinatorial test attribute values 262.1 and second combinatorial test attribute values 262.2, such as the attribute values indicated in Table 2), may respectively produce Heyting value 1 264.1 and Heyting value 2 264.2 that represent the success rate for the particular combinatorial tests.

As multiple versions of the SUT are run and respective covering arrays 260 are created, the respective Heyting values 264 across versions for a given combinatorial test oracle may be combined into an eigenvector 266 that represents the change over time for that combinatorial test oracle. FIG. 2B illustrates the eigenvector 266 that is created from the Heyting value 1.2 (corresponding to the combinatorial test attribute values of the second Table 2 row), and the Heyting value N.2 (corresponding to the combinatorial test attribute values of the second Table 3 row). Separate eigenvectors 266 may be produced for each of the combinatorial tests corresponding to table rows, as well as combinations of them. The eigenvector(s) 266 may then be converted into an eigenvalue 268 that represents an overall success value for the test framework/model 250.i, that is, this eigenvalue 268 becomes a point-in-time value representing the overall health and stability of a given test model 250.i. Due to the success rate of a given coverage array 260 entry being updated through time, the eigenvalue 268, as a representation of a health value for the test framework 250.i, may be automatically adjusted according to the state of the SUT as it develops over different versions (i.e., as new versions are introduced) by recalculating the eigenvalue after the eigenvector is updated in subsequent regression runs. The success, or lack thereof, is relative to the SUT/Project. In some embodiments, a general assumption may be made that an eigenvalue of <100% means maintenance is necessary.

These eigenvectors and eigenvalues thus provide a quality assurance engineer with a new metric enabling them to more thoroughly maintain and enhance their existing test infrastructures. The quality assurance engineer may respond to a decreasing eigenvalue by performing maintenance or by giving the quality assurance engineer an understanding that a given test/infrastructure is deprecated and no longer necessary/relevant for a given SUT/Project.

The use of hidden variable detection with Heyting algebra vectors, which may be stored at different times and at different rates in an eigenvector, may permit modeling and displaying the eigenvector in many visualizations ways, such as a line graph. The hidden variables may be environments, services, etc., that may interfere or influence a test despite being outside of its intended scope of testing. More hidden variables/influences could negatively impact a test's health. The eigenvector provides a list of values over time. The eigenvalue is the scalar (average of values in the vector) representing the overall health, which is an important metric, as anomalies can and do happen. By looking at the values over time, areas that improve (and degrade) can be seen, as well as hi-lighted focal points for an n+1 (future) phase/version of the test process. By using eigenvectors, the Heyting values can all be represented in the covering array to create a unit vector representing model coverage over time. The changes may then be monitored/tracked based on new test case generation and changes to the source code for the SUT as new development accrues. This permits monitoring test case quality improvement. The eigenvalue may represent a single eigenvector or, in some embodiments, it may represent a plurality of eigenvectors from different tests. The different tests may, in some embodiments, share common attributes.

As the n-wise covering array is re-generated (i.e., regenerating the entries in Tables 2 and 3) with alternative seeds for the same code base on the SUT, the model's accuracy, quality, and stability may be calculated again. The re-generated covering array may have some of the same rows from the original table, but will likely include new entries that are not present in the original table. This will allow for improved coverage of the test space, which provides a better likelihood of identifying the bug(s) present in the current model as denoted by the decreased health of the code, which may make identifying the problems much easier.

Figure 3:
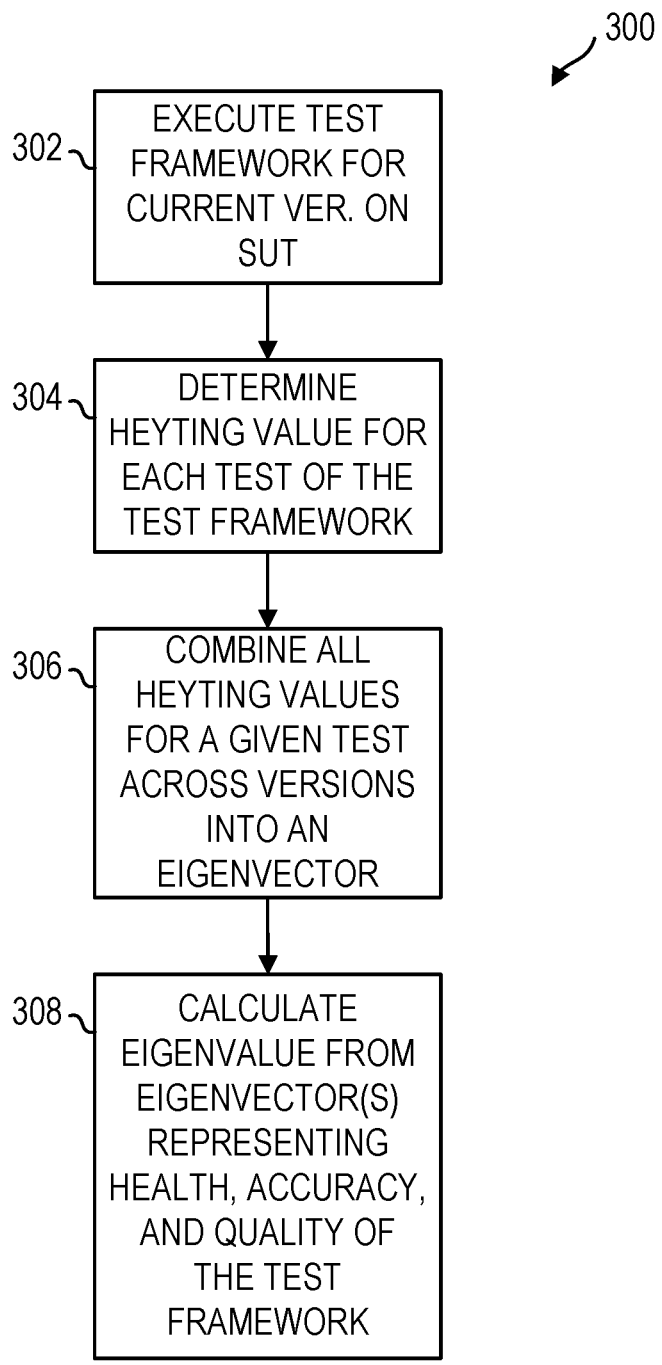
FIG. 3 is a flowchart illustrating a process for implementing some embodiments of a software test quality verification system, according to some embodiments.

FIG. 3 is a flowchart of a process 300 that may be used, according to some embodiments. In operation 302, the test framework 250, which may comprise a covering array, is used to test a current (or first) version of the SUT 200. In operation 304, the test framework 250 is executed, and, for each test in the test framework (corresponding to a row in Tables 2 and 3), a success rate value, such as the Heyting value, 264 is determined that represents a success rate for that particular test. By way of an illustrative example, in the first row of Table 3, a Heyting value 264 of 0.8 may indicate a failure rate of 20% for repeated iterations or variations of the test. In operation 306, all of the Heyting values across versions for a that particular test are combined into an eigenvector that represents success rates across versions for each of the respective tests in the test framework. In operation 308, an eigenvalue may be calculated from the eigenvector that represents a first state, e.g., the health, accuracy, and quality, of the test framework. As the SUT 200 evolves over time, i.e., by different versions of the software or versions of the respective software components being introduced, so too the test framework may (or may not) evolve over time. The eigenvalue of each particular test framework 250 may be compared to determine if the respective test framework 250 represents an improvement, a maintenance of the status quo, or a worsening of the test framework 250 for testing the SUT 200 or of the SUT 200 as they evolve. Such categorization may involve the use of thresholds, and may indicate specific areas to focus on improving either in the test framework 250 or the SUT 200. The eigenvectors and eigenvalues may be provided to the maintainer of the SUT for improving a reliability of the test framework and reducing problems in at least one of the first version of the SUT and a subsequent version of the SUT. As versions of the SUT evolve and/or the test framework evolves, information showing changes from one version of the SUT to the next, or from one version of the framework to the next may be provided to the maintainer of the SUT.

In sum, by utilizing an eigenvector that congregates all test cases in the model and tracks the combinatorial test design (CTD) model's hidden variable degradation, areas of improvement in the model and/or areas that system/integration test should focus on may be highlighted the next round of tests to execute with an aim to get to a clear binary repeatable/re-creatable test case.

Technical Application

The one or more embodiments disclosed herein accordingly provide an improvement to computer technology. For example, an improvement to determining a quality of a test framework for testing an SUT solves a technical problem in software development for ensuring that the test framework is not degraded as changes to a software system are introduced.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising, using a processor of a software test system:
   executing a plurality of tests associated with a covering array of a test framework of the software test system on a first version of a system under test (SUT);
   for each of the plurality of tests, on a current test, determining a current success rate value (SRV) for the current test that represents a success rate of the current test;
   combining the current SRV of the first version of the SUT and current SRVs of the tests of the first version of the SUT into a current test eigenvector associated with the current test;
   converting the current test eigenvector into a first eigenvalue that represents a first state of the first version of the SUT, wherein converting the current test eigenvector into the first eigenvalue comprises converting the current test eigenvector and a further test eigenvector associated with a further test of the plurality of tests into the first eigenvalue;
   wherein the current test and the further test comprise at least one common attribute; and
   providing the eigenvectors and eigenvalues associated with the first version of the SUT to a maintainer of the SUT for improving a reliability of the test framework and reducing problems in at least one of the first version of the SUT and a subsequent version of the SUT.

2. The method of claim 1, wherein the SRVs are Heyting values.

3. The method of claim 1, further comprising:
   executing the plurality of tests on a second version of the system under test (SUT);
   for each of the plurality of tests, on a current test determining a current success rate value (SRV) for the current test that represents a success rate of the current test;
   combining the current SRV of the second version of the SUT, the current SRV of the first version of the SUT, and the current SRVs of the tests into a current test eigenvector associated with the current test;
   converting the eigenvector into a second eigenvalue that represents a health, accuracy, and quality of the second version of the SUT; and
   providing the eigenvectors and eigenvalues associated with the second version of the SUT along with information showing a change from the eigenvectors and eigenvalues associated with the first version of the SUT to the maintainer of the SUT.

4. The method of claim 1, wherein the test framework comprises a combinatorial test oracle that provides the plurality of tests.

5. The method of claim 1, further comprising modeling and displaying the eigenvector on a user display as a line graph.

6. The method of claim 1, further comprising regenerating the covering array with alternative seeds on the test array for the SUT, and recalculating the SRVs, the eigenvector, and the eigenvalue based on the alternative seeds.

7. The method of claim 1, wherein the covering array is a subset of all possible combinations of test attribute values.

8. A computer software test system, comprising:
   a memory; and a processor that is configured to:
execute a plurality of tests associated with a covering array of a test framework of the software test system on a first version of a system under test (SUT);
for each of the plurality of tests, on a current test:
determine a current success rate value (SRV) for the current test that represents a success rate of the current test for the first version of the SUT; and
combine the current SRV of the first version of the SUT and current SRVs of the current test for prior versions of the SUT into a current test eigenvector associated with the current test;
convert the current test eigenvector into a first eigenvalue that represents a first state of the first version of the SUT, wherein converting the current test eigenvector into the first eigenvalue comprises converting the current test eigenvector and a further test eigenvector associated with a further test of the plurality of tests into the first eigenvalue;
wherein the current test and the further test comprise at least one common attribute; and
provide the eigenvectors and eigenvalues associated with the first version of the SUT to a maintainer of the SUT for improving a reliability of the test framework and reducing problems in at least one of the first version of the SUT and a subsequent version of the SUT.

9. The system of claim 8, wherein the SRVs are Heyting values.

10. The system of claim 8, wherein the processor is further configured to:
execute the plurality of tests on a second version of the system under test (SUT);
for each of the plurality of tests, on a current test:
determine a current success rate value (SRV) for the current test that represents a success rate of the current test for the second version of the SUT; and
combine the current SRV of the second version of the SUT, the current SRV of the first version of the SUT, and the current SRVs of the current test for the prior versions of the SUT into a current test eigenvector associated with the current test;
convert the eigenvector into a second eigenvalue that represents a health, accuracy, and quality of the second version of the SUT; and
provide the eigenvectors and eigenvalues associated with the second version of the SUT along with information showing a change from the eigenvectors and eigenvalues associated with the first version of the SUT to a maintainer of the SUT.

11. The system of claim 8, wherein the test framework comprises a combinatorial test oracle that provides the plurality of tests.

12. The system of claim 8, wherein the processor is further configured to model and display the eigenvector on a user display as a line graph.

13. The system of claim 8, wherein the processor is further configured to regenerate the covering array with alternative seeds on the test array for the SUT, and recalculate the SRVs, the eigenvector, and the eigenvalue based on the alternative seeds.

14. A computer program product for a computer software test system, the computer program product comprising:
one or more computer readable storage media, and program instructions collectively stored on the one or more computer readable storage media, the program instructions comprising program instructions to:
execute a plurality of tests associated with a covering array of a test framework of the software test system on a first version of a system under test (SUT);
for each of the plurality of tests, on a current test:
determine a current success rate value (SRV) for the current test that represents a success rate of the current test for the first version of the SUT; and
combine the current SRV of the first version of the SUT and current SRVs of the current test for prior versions of the SUT into a current test eigenvector associated with the current test;
convert the current test eigenvector into a first eigenvalue that represents a first state of the first version of the SUT, wherein converting the current test eigenvector into the first eigenvalue comprises converting the current test eigenvector and a further test eigenvector associated with a further test of the plurality of tests into the first eigenvalue;
wherein the current test and the further test comprise at least one common attribute; and
provide the eigenvectors and eigenvalues associated with the first version of the SUT to a maintainer of the SUT for improving a reliability of the test framework and reducing problems in at least one of the first version of the SUT and a subsequent version of the SUT.

15. The computer program product of claim 14, wherein the SRVs are Heyting values.

16. The computer program product of claim 14, wherein the instructions further configure the processor to:
execute the plurality of tests on a second version of the system under test (SUT);
for each of the plurality of tests, on a current test:
determine a current success rate value (SRV) for the current test that represents a success rate of the current test for the second version of the SUT; and
combine the current SRV of the second version of the SUT, the current SRV of the first version of the SUT, and the current SRVs of the current test for the prior versions of the SUT into a current test eigenvector associated with the current test;
convert the eigenvector into a second eigenvalue that represents a health, accuracy, and quality of the second version of the SUT; and
provide the eigenvectors and eigenvalues associated with the second version of the SUT along with information showing a change from the eigenvectors and eigenvalues associated with the first version of the SUT to a maintainer of the SUT.

17. The computer program product of claim 14, wherein the test framework comprises a combinatorial test oracle that provides the plurality of tests.

18. The computer program product of claim 14, wherein the processor is further configured to model and display the eigenvector on a user display as a line graph.

* * * * *